Feb. 11, 1969 A. SIEGELMAN ET AL 3,427,635

RECORDING STYLUS ARM

Filed May 29, 1967

INVENTORS
Leslie E. Fowler &
Abe Siegelman
BY A. M. Fernandez
ATTORNEY

United States Patent Office 3,427,635
Patented Feb. 11, 1969

3,427,635
RECORDING STYLUS ARM

Abe Siegelman, Morton Grove, and Leslie E. Fowler, Arlington Heights, Ill., assignors to Beckman Instruments, Inc., a corporation of California Filed May 29, 1967, Ser. No. 641,928
U.S. Cl. 346—139 9 Claims
Int. Cl. G01d *15/16, 15/10*

ABSTRACT OF THE DISCLOSURE

A tapered stylus arm for recording instruments having less inertia for motion about a pivot and increased rigidity, both in a plane parallel to a record medium and in a plane normal thereto, achieved by uniting a pair of elongated members having substantially U-shaped sections of decreasing dimensions further out from the pivot to the stylus. For heat recording, the stylus is an electrically heated wire suspended from and electrically connected to tabs, each connected to a different member, and the members are united by an electrically insulating material whereby the members may be used as electrical conductors from the pivot to the stylus.

This invention relates to an improved stylus arm, and more particularly, to a stylus arm for heat recording.

In many applications, recording instruments are required to respond to step functions or high frequency signals. If the stylus arm is not sufficiently rigid in the plane parallel to the record medium, some distortion of the signal will appear in the trace as recorded, and if not sufficiently rigid in the plane normal to the record medium, uniform pressure required for recording with a uniform trace is difficult. Various structures have been devised for the stylus arm of such high speed recorders, but often at the expense of increasing inertia, as by adding ribs and webs, or increasing the thickness of the structural members, or both.

An object of this invention is to provide an improved stylus arm having high rigidity and low inertia.

Another object is to provide an improved heat recording stylus having high rigidity, low inertia, and a current path through the stylus arm structure itself for heating the stylus.

These and other objects are achieved by forming two similar elongated members having substantially U-shaped cross sections in planes perpendicular to the length thereof. To reduce inertia, the dimensions of the cross sections are decreased in successive planes moving out from the pivot to the stylus. The two members are then united along their edges to form a tapered arm having low inertia, and high rigidity, in planes normal and parallel to the record medium. For a heat recorder, the stylus is comprised of a heating element suspended between two tabs, one protruding from each member and electrically connected thereto, such as by solder, brazing, or welding. The two members are adhesively joined together with electrically insulating material, such as epoxy, or the like. The two members are then employed as conductors for passing electrical current through the heating element.

Other objects and advantages of the present invention may be more readily understood from the following description of preferred embodiments with reference to the accompanying drawing in which.

Figures 1, 2, 3, 4, 5, 6, 7:
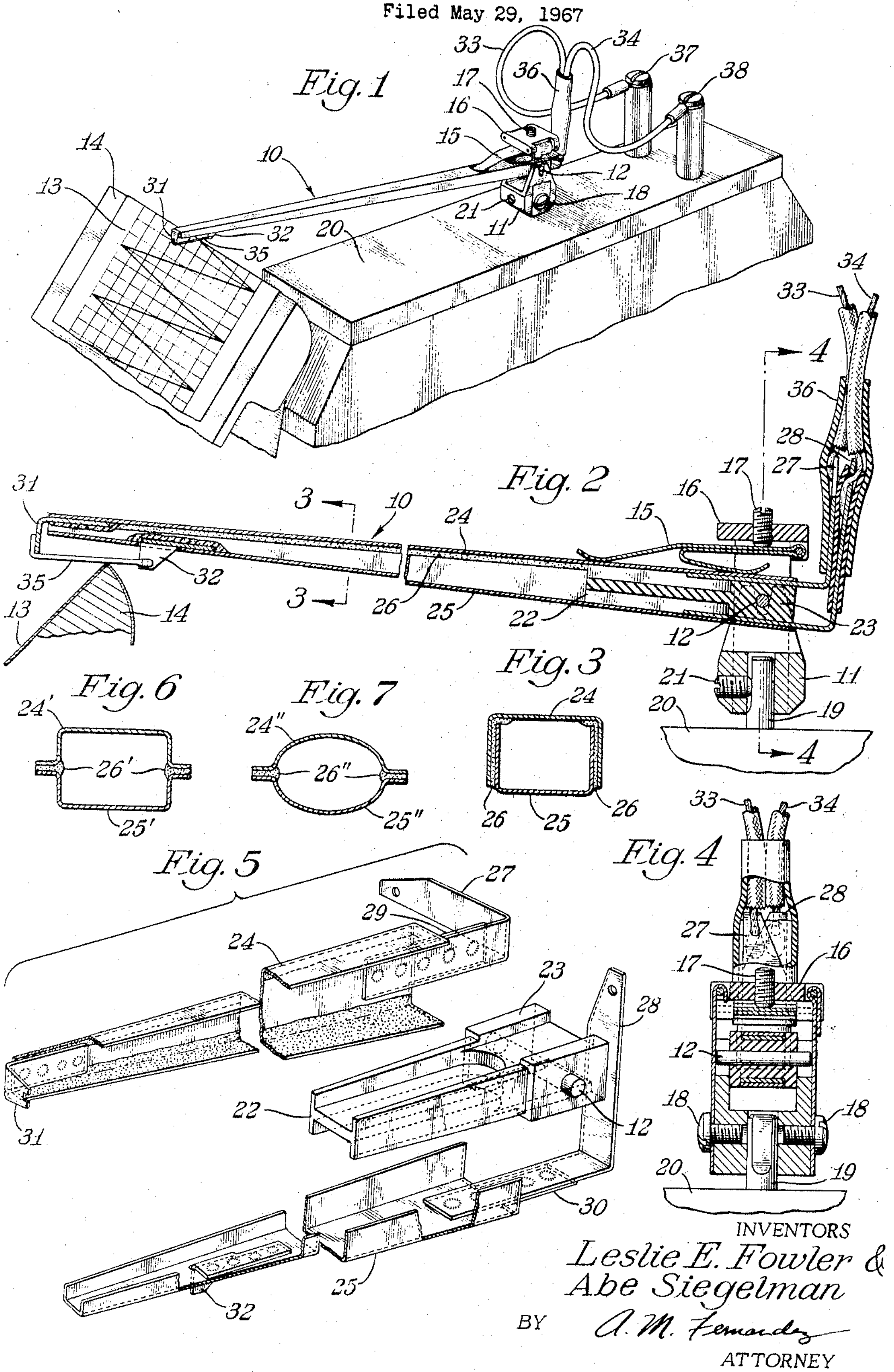
FIGURE 1 is a perspective view of the invention as employed in a heat recorder.
FIGURE 2 is a sectional side view of an enlarged portion of FIGURE 1.
FIGURE 3 is a full sectional view taken along line 3—3 of FIGURE 2.
FIGURE 4 is a full sectional view taken along line 4—4 of FIGURE 2.
FIGURE 5 is an exploded view of the preferred embodiment of the invention shown in FIGURE 1.
FIGURE 6 is a full sectional view of a second embodiment of the invention taken along the same line as FIGURE 3.
FIGURE 7 is a full sectional view of a third embodiment of the invention taken along the same line as FIGURE 3.

Referring now to the drawings, a recording stylus arm indicated by the general reference 10 is shown mounted in a cradle 11 more clearly seen in FIGURES 2 and 4. A trunnion of transverse pin 12 supports the recording arm on the cradle so that it may rotate in a plane perpendicular to a record medium 13 on a writing table or forming bar 14. A spring 15 carried by a bale 16 biases the arm toward the forming bar 14 and the cradle 11. A screw 17, more clearly shown in FIGURES 2 and 4, is provided to adjust the pen bias force against the forming bar. The bale 16 is secured to the cradle by screws 18 (FIGURE 4) and the cradle is secured by a set screw 21 to a drive motor shaft 19 protruding from a motor housing 20, as more clearly shown in FIGURE 2.

In operation, the stylus arm 10 is driven from its neutral position shown in FIGURE 1 to either side, and from side to side, in accordance with signals applied to the drive motor. Since the arm must be relatively long in order for it to reach from a convenient pivot on the housing 20 to the forming bar 14, and in order to be able to record signals on a conveniently wide scale, it is necessary for the arm 10 to be sufficiently rigid to avoid any lateral or vertical bending. Rigidity is readily provided at the pivot end of the arm by a short I-beam section 22 connected to a block section 23 through which the pin 12 passes, as shown in FIGURE 5. However, it would not be feasible to provide rigidity out to the stylus end of the arm in that manner because the inertia of the arm (given by the familiar equation $I=_{i=1}m_i r_i^2$) would be too large. Where I is the rotational inertia, *m* an element of mass, and *r* is the distance the element of mass is from the center of rotation. Other structures employed in the past would similarly increase inertia and thereby limit the frequency response of a motor having a given torque.

In accordance with the present invention, high rigidity is provided at the greater distances from the pivot without unduly increasing the mass, by forming the arm 10 of two members 24 and 25, each having substantially U-shaped sections of decreasing dimensions further out from the pivot, as shown in FIGURE 5, and one having slightly larger dimensions as more clearly shown in FIGURE 3. The two members, preferably made of thin metal foil, are cemented together with electrically insulating material 26, such as epoxy, applied to the inside of the larger member, or the outside of the smaller member, or both, as shown in FIGURES 3 and 5. However, before that is done, L-shaped members 27 and 28 are electrically connected to rearwardly protruding tabs 29 and 30 of the respective members 24 and 25, as shown in FIGURES 2 and 5. That is preferably done by welding, but may be done by brazing or soldering. At the same time, but in separate steps if desired, tabs 31 and 32 are similarly connected to the respective members 24 and 25.

Once the members 24 and 25 have been assembled with their respective tabs and united as shown in FIGURES 2 and 3, electrical conductors 33 and 34 are connected to tabs 27 and 28 to provide current through a stylus 35 comprising a high resistance wire suspended between the tabs 31 and 32. The stylus 35 is preferably welded or brazed to the tabs 31 and 32, but may be simply crimped around holes therein.

A sleeve 36 of flexible material is slipped over the connections of the conductors 33 and 34 to the tabs 27 and 28. The conductors 33 and 34 are preferably made of braided wire for flexibility. Power to the heat recording stylus is thereby provided through the electrically insulated members 24 and 25 from terminals 37 and 38. In that manner, the separate insulated electrical conductors 33 and 34 are not required to extend through the arm to the stylus.

Others have sought to employ members of an arm in a heat recorder as the conductors of current to the stylus in order to decrease inertia, but the members have been in the form of heavy wires or rods separated by plastic or epoxy impregnated fiber spacers and webs. However, such stylus arms do not provide rigidity in two planes, only in one plane passing through both members. An advantage of this invention is greater rigidity in the two perpendicular planes of interest, as well as in other planes, with less mass, and therefore less inertia, than has been possible hereinbefore.

In assembling the arm 10, the component parts are first connected in subassemblies as shown in FIGURE 5. The subassemblies are then combined and united as shown in FIGURE 2 and described heretofore, after which the electrical conductors 33 and 34 are connected in a customary manner with the sleeve 36 over the connections. Thereafter, or at a time prior thereto, the heat stylus 35 is connected to the tabs 31 and 32 in the manner described heretofore.

The L-shaped tabs 27 and 28 are seated between shoulders of the block section 23, and the united members 24 and 25 are fitted snugly against the block section 23, the sides of which extend away from the I-beam section sufficiently to just fully meet abutting end of the united members. Although the shoulders and extending sides of the block section 23 are not essential to the practice of the invention, they are desirable in order to present a pleasing appearance, and more importantly to assure properly positioning the united members 24 and 25 sufficiently back, and not too far back, on the I-beam section.

In practice, the members 24 and 25 may be first united and then slipped into position over the I-beam section if the tab 28 is not bent into an L-shape until some time thereafter, or if the tabs 27 and 28, or at least the tab 28, are designed to be straight, as they obviously may be. Regardless of how the I-beam section 22 is put in place, an adhesive, such as epoxy, may be used to securely hold the assembly together. Such an adhesive would be preferred if the I-beam section 22 and block section 23 are made of molded plastic to further reduce inertia. However, if made of some metal, the assembly may be welded or brazed together, or held together by small screws passing through the members 24 and 25 and into threaded holes in the I-beam section 22.

The members 24 and 25 of the arm may be formed with a section as shown in FIGURES 6 and 7 wherein like parts are designated by the reference numerals 24′, 25′ and 24″, 25″. The advantage of a tapered arm constructed of two U-shaped members may be practiced to equal advantage with abutting flanges extending along thin edges and secured together with an insulating material 26′, and 26″, such as epoxy, as shown. It should also be apparent that the members could be formed with other U-shaped sections aside from the ones which produce a rectangular section as in FIGURES 3 and 6, and an elliptical section as in FIGURE 7.

The advantage of a tapered arm constructed of two U-shaped members as described could also be used to advantage for other types of recorders such as ink, by replacing the stylus with another type of stylus. For instance, for ink recording, the stylus may be replaced by a pen tip suitably secured in place, as by bonding it to the member 24 in place of the tab 31, and providing a plastic ink supply tube to the pen tip through the center of the assembled members 24 and 25. In such cases, the members need not necessarily be united with insulating material, and may even be secured together by welding or brazing, or in the case of the embodiments of FIGURES 6 and 7, by extending flange of one member beyond that of the other and crimping the longer flange over the other.

We claim:

1. A rigid recording arm having low inertia for motion about a pivot comprising a pair of elongated members having substantially U-shaped sections of decreasing dimensions further out from the pivot at one end to the stylus at the other end thereof, said members both extending from the pivot to the stylus and being combined to form a hollow tapered arm, and means for uniting said members.

2. A rigid recording arm as described in claim 1 wherein said members are made of metal and said means comprises insulating material disposed between said members to electrically isolate one from the other.

3. A rigid recording arm as described in claim 2 including a first tab extending downwardly from one member and a second tab extending outwardly and downwardly from the other members, both tabs being disposed at the end of said arm remote from said pivot, each tab being made of metal and electrically connected to its associated member, a heating stylus suspended between said tabs and electrically connected to each, and means for connecting a flexible electrical conductor to each of said members for providing current to said stylus through said members.

4. A rigid recording arm as described in claim 3 including a block section having a trunion for mounting in a cradle attached to a drive motor and a tapered rigid section having a substantial cross section comprised of at least two sides and one reinforcing web, said tapered section being inserted into said arm at the pivot end thereof.

5. A rigid recording arm as described in claim 2 wherein dimensions of a given section of one member are smaller than the dimensions of a corresponding section of the other member whereby the sides of the one member fit within the sides of the other member.

6. A rigid recording arm as described in claim 2 wherein the dimensions of a given section of one member are the same as the dimensions of the corresponding section of the other member whereby the flanges of the one member will be joined to the flanges of the other member.

7. A rigid recording arm as described in claim 5 wherein said members are made of metal and said means comprises insulating material disposed between adjacent sides of said member.

8. A rigid recording arm as described in claim 7 including a first tab extending downwardly from one member and a second tab extending outwardly and downwardly from the other members, both tabs being disposed at the end of said arm remote from said pivot, each tab being made of metal and electrically connected to its associated member, a heating stylus suspended between said tabs and electrically connected to each, and means for connecting a flexible electrical conductor to each of said members for providing current to said stylus through said members.

9. A rigid recording arm as described in claim 8 including a block section having a trunion for mounting in a cradle attached to a drive motor and a rigid section having a substantial cross section comprised of at least two sides and one reinforcing web, said tapered section being inserted into said arm at the pivot end thereof.

References Cited

UNITED STATES PATENTS

| | | | |
|---|---|---|---|
| 1,765,988 | 6/1930 | Mayer et al. | 346—76 |
| 1,901,921 | 3/1933 | Means | 346—76 X |
| 2,729,104 | 1/1956 | Shuck et al. | 346—113 X |
| 3,346,871 | 10/1967 | Fowler | 346—139 |

FOREIGN PATENTS 617,577 2/1961 Italy.

RICHARD B. WILKINSON, *Primary Examiner.*

JOSEPH W. HARTARY, *Assistant Examiner.*

U.S. Cl. X.R.

346—76